(12) United States Patent
Imamura et al.

(10) Patent No.: US 10,994,340 B2
(45) Date of Patent: May 4, 2021

(54) SURFACE-COATED CUTTING TOOL AND METHOD FOR MANUFACTURING THE SAME

(71) Applicant: Sumitomo Electric Hardmetal Corp., Itami (JP)

(72) Inventors: Shinya Imamura, Sorachi-gun (JP); Hideaki Kanaoka, Sorachi-gun (JP); Anongsack Paseuth, Sorachi-gun (JP); Satoshi Ono, Sorachi-gun (JP); Kouhei Yoshimura, Sorachi-gun (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 58 days.

(21) Appl. No.: 16/328,210

(22) PCT Filed: May 25, 2017

(86) PCT No.: PCT/JP2017/019484
§ 371 (c)(1),
(2) Date: Feb. 25, 2019

(87) PCT Pub. No.: WO2018/037648
PCT Pub. Date: Mar. 1, 2018

(65) Prior Publication Data
US 2019/0232385 A1    Aug. 1, 2019

(30) Foreign Application Priority Data

Aug. 25, 2016   (JP) .............................. JP2016-164781

(51) Int. Cl.
*B23B 27/14* (2006.01)
*B24B 3/34* (2006.01)
*B23G 5/06* (2006.01)
*B23D 77/00* (2006.01)
*B23B 51/00* (2006.01)
(Continued)

(52) U.S. Cl.
CPC ............ *B23B 27/148* (2013.01); *B23B 27/14* (2013.01); *B23B 51/00* (2013.01); *B23C 5/16* (2013.01);
(Continued)

(58) Field of Classification Search
CPC ........................... B23B 27/14; B23B 2224/04
(Continued)

(56) References Cited

U.S. PATENT DOCUMENTS 7,431,747 B2 * 10/2008 Heinrich ............... B23B 27/148
428/701
7,838,132 B2    11/2010 Ahlgren et al.
(Continued)

FOREIGN PATENT DOCUMENTS

CN    102821897 A    12/2012
JP    H06-079502 A    3/1994
(Continued)

*Primary Examiner* — Archene A Turner
(74) *Attorney, Agent, or Firm* — Baker Botts L.L.P.; Michael A. Sartori

(57) ABSTRACT

A surface-coated cutting tool includes a base material and a coating formed on the base material. The base material is a cemented carbide or a cermet. A surface of the base material includes a rake face, a flank face, and a cutting edge face connecting the rake face to the flank face. The base material has an oxygen concentration of less than or equal to 1 at. % at a depth position of 0.4 μm from the cutting edge face. The coating includes a hard layer. A topmost layer in the hard layer has a compressive stress of more than or equal to 1.5 GPa in absolute value.

7 Claims, 7 Drawing Sheets

(51) Int. Cl.
   *B23C 5/16* (2006.01)
   *B23F 21/00* (2006.01)
   *B23C 5/20* (2006.01)

(52) U.S. Cl.
   CPC ............... *B23C 5/20* (2013.01); *B23D 77/00* (2013.01); *B23F 21/00* (2013.01); *B23G 5/06* (2013.01); *B24B 3/34* (2013.01); *B23B 2224/04* (2013.01)

(58) Field of Classification Search
   USPC ............ 51/307, 309; 428/212, 698, 701, 702
   See application file for complete search history.

(56) References Cited

U.S. PATENT DOCUMENTS

| | | | | |
|---|---|---|---|---|
| 2007/0184272 | A1* | 8/2007 | Moriguchi | C23C 14/0015 428/411.1 |
| 2007/0227298 | A1* | 10/2007 | Tanibuchi | C22C 29/08 75/241 |
| 2009/0067938 | A1* | 3/2009 | Omori | C23C 30/005 407/119 |
| 2012/0128955 | A1* | 5/2012 | Leicht | C23C 16/56 428/698 |
| 2012/0282049 | A1* | 11/2012 | Okada | C23C 16/0272 407/115 |
| 2013/0022420 | A1 | 1/2013 | Waki et al. | |
| 2017/0216929 | A1 | 8/2017 | Shirochi | |

FOREIGN PATENT DOCUMENTS

| | | | |
|---|---|---|---|
| JP | 08-092685 | * | 4/1996 |
| JP | 2007-283478 | A | 11/2007 |
| JP | 2008-069420 | A | 3/2008 |
| JP | 2009-006439 | A | 1/2009 |
| JP | 2013-107187 | A | 6/2013 |
| JP | 2013-244549 | A | 12/2013 |
| WO | 2016/017790 | A1 | 2/2016 |

* cited by examiner

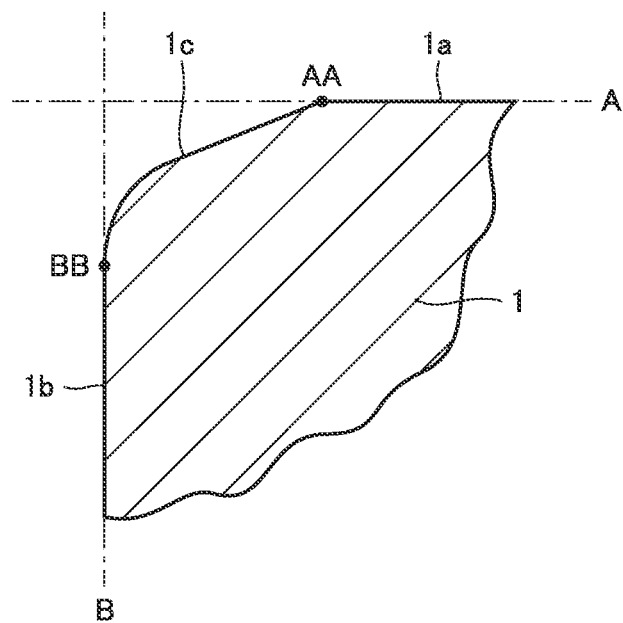

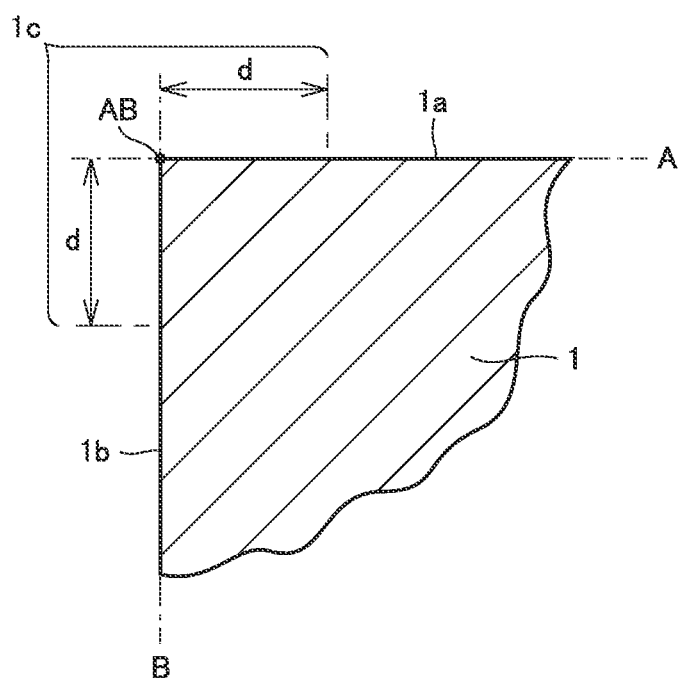

SURFACE-COATED CUTTING TOOL AND METHOD FOR MANUFACTURING THE SAME

TECHNICAL FIELD

The present invention relates to a surface-coated cutting tool and a method for manufacturing the surface-coated cutting tool. The present application claims priority to Japanese Patent Application No. 2016-164781 filed on Aug. 25, 2016, the disclosure of which is hereby incorporated by reference in its entirety.

BACKGROUND ART

It has been studied to extend the life of the cutting tool by improving tool characteristics such as wear resistance and fracture resistance. For example, Japanese Patent Laying-Open No. 2013-244549 (PTL 1) discloses a surface-coated cutting tool having a coating formed on a surface of a base material. The coating can be formed on the base material to further improve the characteristics of the cutting tool.

Japanese Patent Laying-Open No. 6-079502 (PTL 2) discloses an approach to impart a compressive stress to the coating by performing a post treatment on the coating on the base material. It is considered that the compressive stress can be imparted to improve the toughness of the coating and accordingly improve the fracture resistance of the cutting tool.

CITATION LIST

Patent Literature

PTL 1: Japanese Patent Laying-Open No. 2013-244549
PTL 2: Japanese Patent Laying-Open No. 6-079502

SUMMARY OF INVENTION

A surface-coated cutting tool according to an aspect of the present disclosure is a surface-coated cutting tool including a base material and a coating formed on the base material. The base material is a cemented carbide or a cermet. A surface of the base material includes a rake face, a flank face, and a cutting edge face connecting the rake face to the flank face. The base material has an oxygen concentration of less than or equal to 1 at. % at a depth position of 0.4 μm from the cutting edge face. The coating includes a hard layer. A topmost layer in the hard layer has a compressive stress of more than or equal to 1.5 GPa in absolute value.

A method for manufacturing a surface-coated cutting tool according to an aspect of the present disclosure is a method for manufacturing the above-described surface-coated cutting tool. The method includes: preparing a base material precursor; producing a base material by machining a surface of the base material precursor; forming, on the base material, a coating including a hard layer; and imparting a compressive stress to the coating. The machining is one of: a first grinding process of alternately repeating wet grinding and dry grinding; a second grinding process of performing low-feed low-depth-of-cut wet grinding; or a third grinding process of performing dry grinding.

BRIEF DESCRIPTION OF DRAWINGS

FIG. 6 illustrates another different shape of the cutting edge face.

FIG. 7 illustrates still another different shape of the cutting edge face.

DETAILED DESCRIPTION

Figure 1:
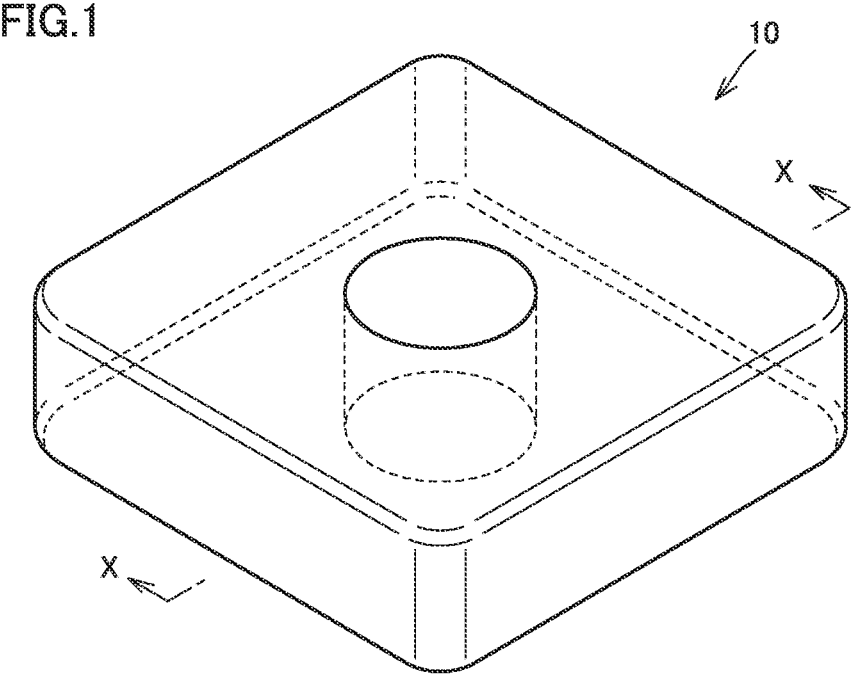
FIG. 1 is a perspective view illustrating an example of a surface-coated cutting tool.

Problem to be Solved by the Present Disclosure

Regarding the aforementioned approach, it is expected that the larger the imparted compressive stress, the further the fracture resistance is improved and accordingly the longer the life of the surface-coated cutting tool. In many cases, however, the surface-coated cutting tool having undergone the post treatment cannot achieve the long life that can be expected.

In view of the above, an object of the present disclosure is to provide a surface-coated cutting tool having an extended life as well as a method for manufacturing the surface-coated cutting tool.

Advantageous Effect of the Present Disclosure

According to the foregoing, a surface-coated cutting tool having an extended life and a method for manufacturing the surface-coated cutting tool are provided.

Description of Embodiments

First of all, the present invention is described based on features listed below. The expression "A to B" as used herein is intended to define an upper limit and a lower limit of a certain range (i.e., from A to B inclusive). As to "A to B" where A is not followed by a unit symbol and only B is followed by a unit symbol, the unit of A is the same as the unit of B.

[1] A surface-coated cutting tool according to an aspect of the present disclosure is a surface-coated cutting tool including a base material and a coating formed on the base material. The base material is a cemented carbide or a cermet. A surface of the base material includes a rake face, a flank face, and a cutting edge face connecting the rake face to the flank face. The base material has an oxygen concentration of less than or equal to 1 at. % at a depth position of 0.4 μm from the cutting edge face. The coating includes a hard layer. A topmost layer in the hard layer has a compressive stress of more than or equal to 1.5 GPa in absolute value.

Through studies conducted by the inventors of the present invention, it has been found that a coating including a hard layer to which a large compressive stress is imparted is likely to drop off from the base material and therefore an expected life extension is difficult to be derived from the imparted compressive stress. Further the inventors conducted detailed studies to eventually find that unintended oxygen atoms entering in the vicinity of the cutting edge face of the base material caused decrease of the adhesiveness between the base material and the coating.

In the surface-coated cutting tool of the present disclosure, the concentration of oxygen atoms in the vicinity of the cutting edge face is controlled to be low as compared with the conventional cutting tool. Specifically, the base material has an oxygen concentration of less than or equal to 1 at. % at a depth position of 0.4 μm from the cutting edge face. Thus, the adhesiveness between the base material and the coating is increased as compared with the conventional cutting tool. Therefore, even when a large compressive stress is imparted to the hard layer included in the coating, drop-off of the coating is suppressed, in contrast to the conventional cutting tool. As seen from the above, regarding the above-described surface-coated cutting tool, deterioration of the fracture resistance due to drop-off of the coating can be suppressed while the wear resistance can be improved by imparting a compressive stress and accordingly the life can be extended.

[2] The base material of the surface-coated cutting tool has an oxygen concentration of less than or equal to 10 at. % at a depth position of 0.2 μm from the cutting edge face. This surface-coated cutting tool is further excellent in adhesiveness between the base material and the coating.

[3] The topmost layer of the surface-coated cutting tool has a compressive stress of more than or equal to 3.5 GPa in absolute value. Accordingly, the wear resistance of the cutting tool is further improved.

[4] The hard layer of the surface-coated cutting tool is a compound layer made from: at least one kind of first element selected from the group consisting of Group IV elements, Group V elements, and Group VI elements in the periodic table, Al, and Si; and at least one kind of second element selected from the group consisting of B, C, N, and O. Such a compound layer is suitable for improving characteristics of the cutting tool.

[5] The topmost layer of the surface-coated cutting tool is a layer made from an oxide containing Al (Al oxide). In this case, significantly high advantageous effects can be produced as compared with the conventional cutting tool.

[6] The cutting edge face of the base material of the surface-coated cutting tool has a strain of less than or equal to 0.07. Accordingly, the peeling resistance of the coating is improved.

[7] A method for manufacturing a surface-coated cutting tool according to an aspect of the present disclosure is a method for manufacturing the above-described surface-coated cutting tool. The method includes: preparing a base material precursor; producing a base material by machining a surface of the base material precursor; forming a coating on the base material; and imparting a compressive stress to the coating. The machining is one of: a first grinding process of alternately repeating wet grinding and dry grinding; a second grinding process of performing low-feed low-depth-of-cut wet grinding; or a third grinding process of performing dry grinding. Accordingly, the surface-coated cutting tool having an extended life can be manufactured.

Details of Embodiments of the Invention

The inventors observed, at various angles, surface-coated cutting tools to which a compressive stress was imparted by a post treatment. As a result, it has been found that in the surface-coated cutting tool having a coating to which a larger compressive stress is imparted, the coating is more likely to drop off partially.

The inventors considered it necessary to suppress drop-off of the coating by improving the adhesion between the coating and the base material. Many approaches, however, have been taken to improve the adhesion between the coating and the base material. The inventors then considered that the conventional approaches could not sufficiently suppress the drop-off of the coating.

In view of the above, for the surface-coated cutting tool from which the coating had dropped off, the inventors performed atomic-level observation in addition to the conventional nano-level observation. Specifically, they used x-ray photoelectron spectroscopy (XPS) in addition to a scanning electron microscope to observe surface-coated cutting tools. As a result, they found that unintended oxygen atoms had entered the base material of the surface-coated cutting tool and the presence of oxygen atoms at a high concentration in the base material made it likely that the coating dropped off from the base material.

In the surface-coated cutting tool, the coating is formed on a surface of the base material in a relatively severe environment. It was therefore originally assumed that the step of forming a coating on the base material supplied oxygen atoms into the base material. However, oxygen atoms had also entered the cutting tool before the coating was formed. The above assumption was thus disproved.

The inventors then focused on machining performed on a base material precursor. "Base material precursor" is a material machined into "base material" by beveling of the surface of the base material precursor to form a cutting edge. In other words, this machining is a process performed on a base material precursor such as a sintered material, so that the base material precursor assumes properties of the base material for the cutting tool. For machining a hard base material precursor, high-feed high-depth-of-cut wet grinding is performed industrially in order to suppress heat generation during the machining or to improve the machining quality. The inventors found that water used for this wet grinding was a source of the oxygen atoms.

Subsequently, the inventors conducted further studies on the difference in the manner in which oxygen atoms enter the base material, depending on the difference in the machining method. The inventors employed a machining method different from conventional methods to succeed in suppressing entering of oxygen atoms. The present invention has been made in this way.

An embodiment (hereinafter referred to as "present embodiment") of the present invention is described in the following. The present embodiment, however, is not limited to those described herein. In the drawings used for the following description of the embodiment, the same reference characters denote the same parts or corresponding parts. A compound or the like expressed herein by a chemical formula includes the compound with any of all conventionally known atomic ratios if the atomic ratio is not particularly limited, and the compound is not necessarily limited to the compound with a stoichiometric ratio. For example, regarding an expression "TiCN," the ratio of the number of atoms between the elements constituting TiCN is not limited to Ti:C:N=1:0.5:0.5, but includes all conventionally known atomic ratios.

<Surface-Coated Cutting Tool>

A surface-coated cutting tool (also referred to simply as "cutting tool" hereinafter) of the present embodiment includes a base material and a coating formed on the base material. The shape and the use for example of the cutting tool are not particularly limited. The cutting tool of the present embodiment may for example be drill, end mill, indexable insert for the drill, indexable insert for the end mill, indexable insert for milling, indexable insert for turning, metal-slitting saw, gear-cutting tool, reamer, tap, or the like.

Figure 2:
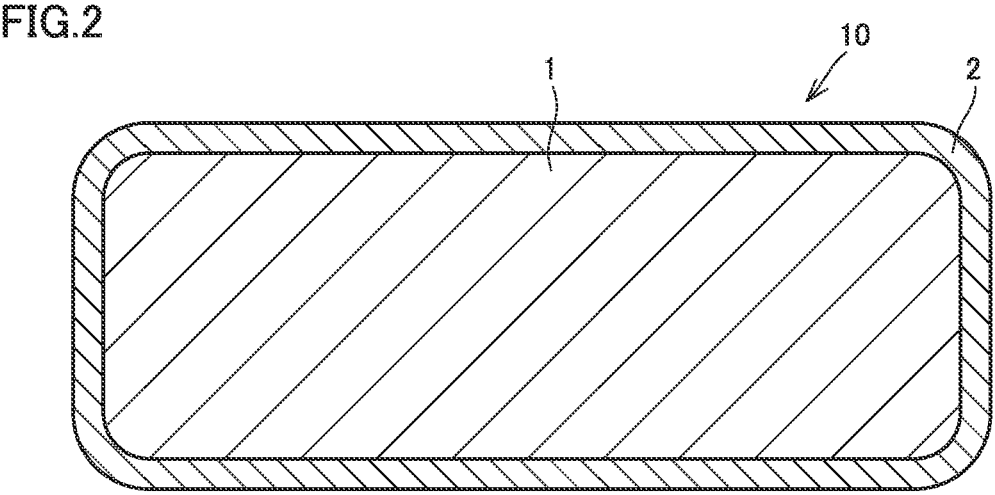
FIG. 2 is a cross-sectional view along line X-X as seen in the direction indicated by arrows in FIG. 1.

FIG. 1 is a perspective view illustrating an example of the cutting tool, and FIG. 2 is a cross-sectional view along line X-X as seen in the direction indicated by arrows in FIG. 1.

Cutting tool 10 has a surface including an upper surface, a lower surface, and four side surfaces. The overall shape of cutting tool 10 is a quadrangular prism of which top-to-bottom thickness is somewhat thin. In cutting tool 10, a through hole extending through the upper and lower surfaces is formed. Along each of the boundaries of the four side surfaces, an arcuate surface connects a side surface to its adjacent side surface.

As to cutting tool 10, the upper surface and the lower surface each form a rake face, the four side surfaces (and the arcuate surfaces connecting them) each form a flank face, and the arcuate surface connecting the rake face to the flank face forms a cutting edge face. The cutting tool having such a shape is used as an indexable insert for turning.

Cutting tool 10 includes a base material 1 and a coating 2 formed on base material 1. Coating 2 may be formed on either a part (e.g. cutting edge face) of the surface of base material 1 or the entire surface of base material 1.

<<Base Material>>

The base material is a cemented carbide or a cermet. The cemented carbide may be a WC-based cemented carbide (also including a cemented carbide containing WC and Co, or alternatively a cemented carbide containing WC and Co and additionally a carbonitride of Ti, Ta, Nb or the like). The cermet may be a cermet containing TiC, TiN, TiCN or the like as a main component. In particular, the cermet is preferably a TiCN-based cermet.

The base material has a surface. The surface includes a rake face, a flank face, and a cutting edge face connecting the rake face to the flank face. The cutting edge face is a surface forming a cutting edge of the cutting tool. Which region of the base material is to form a cutting edge face is determined depending on the shape of the base material, as described below with reference to FIGS. 3 to 5.

Figure 3:
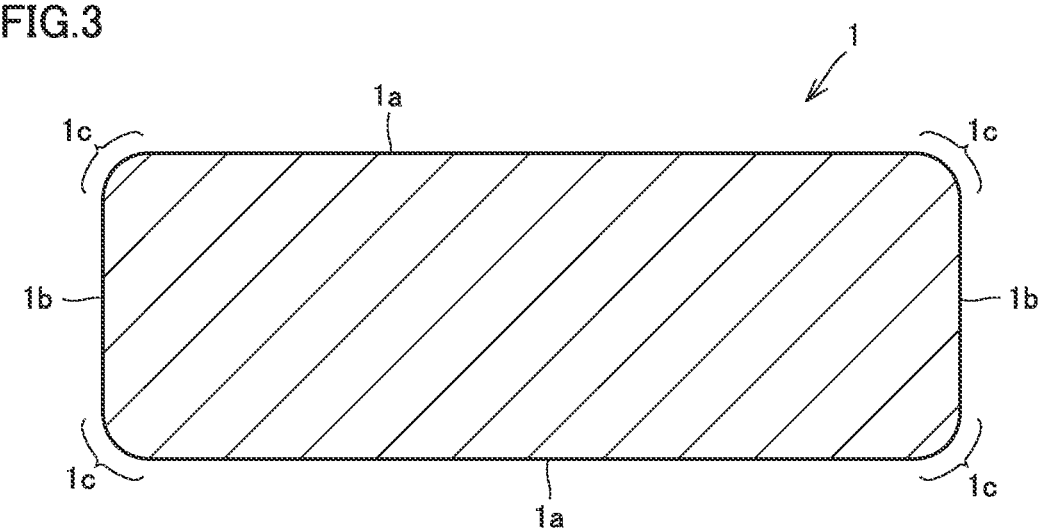
FIG. 3 illustrates only a base material in the cross section of the cutting tool shown in FIG. 2.

FIG. 3 illustrates only the base material in the cross section of the cutting tool shown in FIG. 2. The coating is not shown in FIG. 3 for the sake of facilitating description of the shape of base material 1.

As to base material 1, the upper surface and the lower surface each form a rake face 1a, the four side surfaces (and the arcuate surfaces connecting them) each form a flank face 1b, and the arcuate surface connecting rake face 1a to flank face 1b forms a cutting edge face 1c. Rake face 1a, flank face 1b, and cutting edge face 1c of the base material are respective bases for forming the rake face, the flank face and the cutting edge face, respectively, of the cutting tool.

Figure 4:
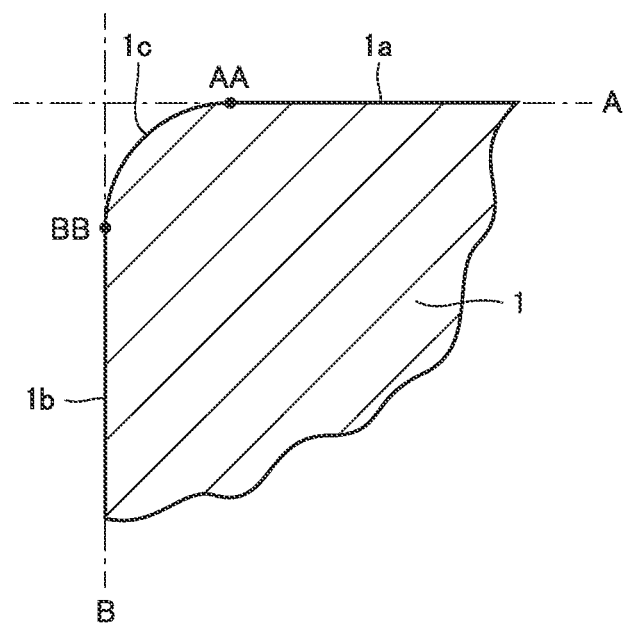
FIG. 4 is partially enlarged view of FIG. 3.

FIG. 4 is a partially enlarged view of FIG. 3. FIG. 4 shows an imaginary plane A including rake face 1a, an imaginary boundary line AA at which rake face 1a and imaginary plane A part from each other, an imaginary plane B including flank face 1b, and an imaginary boundary line BB at which flank face 1b and imaginary plane B part from each other. In FIG. 4, each imaginary plane A, B is shown as a line and each imaginary boundary line AA, BB is shown as a dot. In FIG. 4, the surface inside the region between imaginary boundary line AA and imaginary boundary line BB is cutting edge face 1c.

Thus, cutting edge face 1c is generally a surface of base material 1. The ridgeline at which surfaces of base material 1 meet is machined to form cutting edge face 1c. In other words, base material 1 is formed by machining at least a part of the surface of a base material precursor formed of a sintered material or the like, and cutting edge face 1c is formed through beveling by means of machining.

Figure 5:
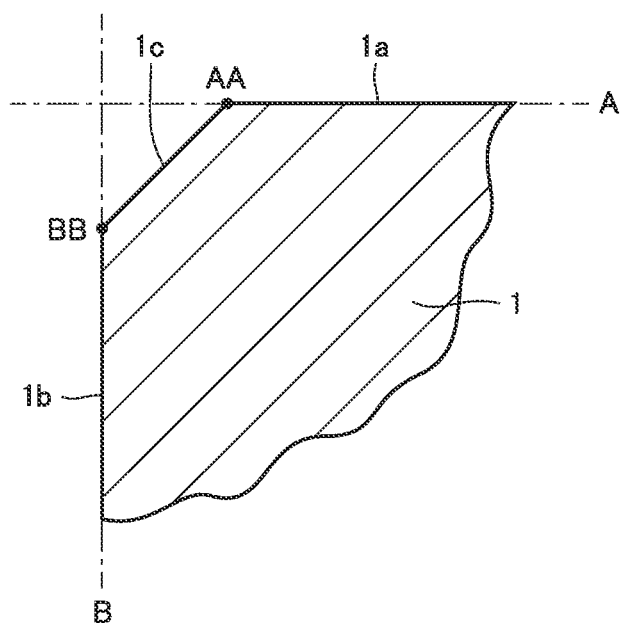
FIG. 5 illustrates a different shape of a cutting edge face.

While FIG. 4 shows cutting edge face 1c which is an arcuate surface, the shape of cutting edge face 1c is not limited to this. For example, as shown in FIG. 5, cutting edge face 1c may have a flat shape. Further, as shown in FIG. 6, cutting edge face 1c may have a shape which is a combination of a flat surface and an arcuate surface.

Regarding base materials 1 having respective shapes as shown in FIGS. 4 to 6 as described above, cutting edge face 1c can be determined easily from its shape only. This is for the reason: cutting edge face 1c in this case is included in none of imaginary plane A and imaginary plane B and can therefore be distinguished easily from rake face 1a and flank face 1b by visual inspection.

Regarding base material 1 having a sharp edge shape as shown in FIG. 7, it is difficult to determine cutting edge face 1c formed by machining, from its shape only. This is for the reason: cutting edge face 1c in this case is included in imaginary plane A and/or imaginary plane B and it is therefore difficult to distinguish cutting edge face 1c from rake face 1a and flank face 1b by visual inspection.

In view of the above, regarding base material 1 having a sharp edge shape, cutting edge face 1c is defined herein as a surface included in a region within a distance d of 100 μm from a ridgeline AB at which rake face 1a and flank face 1b meet each other, since base material 1 included in this region is capable of functioning as a cutting edge of cutting tool 10.

The base material of the present embodiment has an oxygen concentration of less than or equal to 1 at. % at a depth position of 0.4 μm from the cutting edge face. The oxygen concentration can be measured with an XPS analyzer applicable to XPS.

XPS can be used to measure the ratio of atoms of a given kind at a given depth position in a target of measurement while etching the surface of the target by means of ions of Ar for example. Thus, the oxygen concentration at a depth position of 0.4 μm from the cutting edge face which is a surface of the base material can be determined in the following way.

First, in accordance with XPS, the coating located on the surface of the cutting tool corresponding to the cutting edge face of the base material is etched. In the etching process, the depth position at which an element specific to the raw material for the base material (e.g. an element forming a binder phase in the base material) is measured is identified as a cutting edge face of the base material. Then, the oxygen concentration at a depth position of 0.4 μm from the cutting edge face which is the surface of the base material can be determined. The etching area at this time may be 500 to 50000 μm². The oxygen concentration is measured under vacuum.

Regarding the cutting edge face having a sharp edge shape, the cutting edge face includes a cutting edge face on the rake face side and a cutting edge face on the flank face side. In this case, "a depth position of 0.4 μm from the cutting edge face which is a surface of the base material" means a position at a depth of 0.4 μm from one of the cutting edge faces and at a depth of more than or equal to 0.4 μm from the other cutting edge face.

The aforementioned oxygen concentration may be an average value. Specifically, given three measurement sites are determined on the cutting edge face of the base material, and the oxygen concentration is measured at a depth position of 0.4 μm from each of the measurement sites. The average of respective oxygen concentrations measured at these sites may be determined as the oxygen concentration.

The inventors measured the oxygen concentration at a plurality of measurement sites of the cutting edge face to find that there is no significant difference between the value taken at each measurement site and the average value. Therefore, the oxygen concentration may be measured at a given single site of the cutting edge face and the value taken at this site may be determined as the oxygen concentration. If the measured oxygen concentration has an apparently abnormal value, however, such a value should be excluded. The single site is preferably determined in a central portion of the cutting edge face, since this portion contributes significantly to characteristics of the cutting tool and is therefore appropriate as a site for evaluating the characteristics of the cutting tool.

Regarding the cutting tool of the present embodiment, the base material having an oxygen concentration of less than or equal to 1 at. % at a depth position of 0.4 μm from the cutting edge face can impart high adhesiveness between the base material and the coating. Therefore, even when a large compressive stress of 1.5 GPa more is imparted to the topmost layer in the hard layer included in the coating on the base material, drop-off of the coating can be suppressed.

The inventors have found the following (a) to (c) by studies regarding the present disclosure:

(a) in the cutting edge face of the base material for the cutting tool, unintended oxygen atoms have entered, and the oxygen concentration derived from the oxygen atoms is highest in the vicinity of the cutting edge face and decreases gradually toward the inside of the base material;

(b) the higher the oxygen concentration in the vicinity of the cutting edge face, the deeper the locations of oxygen in the base material;

(c) the higher the oxygen concentration in the base material, the lower the adhesiveness between the base material and the coating (coating is likely to drop off).

Based on the above findings, the inventors suppose the reasons why the cutting tool of the present embodiment has the improved adhesiveness. Specifically, in the base material of the conventional cutting tool, unintended oxygen atoms are present in a region from the cutting edge face inward to a certain depth position. In a region in which the oxygen atoms are present at a high concentration that may influence the physical properties of the base material (also referred to as "high oxygen region"), the base material embrittles. The coating located on the embrittled base material is more likely to drop off relative to a coating located on a non-embrittled base material.

In contrast, in the cutting tool of the present embodiment, the base material has an oxygen concentration of less than or equal to 1 at. % at a depth position of 0.4 μm from the cutting edge face. This oxygen concentration value is a smaller value than the conventional cutting tool. The oxygen concentration in the vicinity of the cutting edge face is therefore also smaller than the conventional cutting tool. Thus, embrittlement in the vicinity of the cutting edge face is suppressed. Accordingly, regarding the cutting tool of the present embodiment, the coating is less likely to drop off as compared with the conventional cutting tool, and the adhesiveness between the base material and the coating is improved.

Moreover, since embrittlement in the vicinity of the cutting edge face is suppressed as compared with the conventional cutting tool, decrease of the hardness of the base material may also be suppressed. The suppressed decrease of the hardness of the base material contributes to improvement of the wear resistance of the cutting tool. This is also supposed to contribute to extension of the life of the cutting tool in the present embodiment.

Preferably, in the cutting tool of the present embodiment, the base material has an oxygen concentration of less than or equal to 10 at. % at a depth position of 0.2 μm from the cutting edge face. In this case, the adhesiveness between the base material and the coating can further be improved. Theoretically the oxygen concentration at a depth position of 0.4 μm from the cutting edge face and the oxygen concentration at a depth position of 0.2 μm from the cutting edge face are preferably 0 at. %.

The base material preferably has a strain of less than or equal to 0.07 in the cutting edge face. The strain in the cutting edge face can be determined by applying x-ray diffractometry. High-brightness x-ray like radioactive ray is preferable in that high-precision measurement is possible. As is apparent, however, a common x-ray apparatus may be used.

Regarding a diffraction profile of x-ray diffraction angle (2θ) and diffraction intensity obtained by x-ray diffractometry, it is known that the diffraction peak expands (broadens) depending on each of crystallite size and strain. Each of the diffraction peak depending on crystallite size and the diffraction peak depending on strain can be approximated by a Lorentz function to express the integral breadth β of the diffraction peak by the following expression (1), where βsize is the integral breadth of the diffraction profile depending on crystallite size, and βstrain is the integral breadth of the diffraction profile depending on strain.

$$\beta = \beta size + \beta strain \quad (1)$$

βsize and βstrain are expressed by the following expression (2) and expression (3) where λ is wavelength of x-ray, ε is crystallite size, θ is incident angle of x-ray, η is strain (non-uniform lattice strain), and $\theta_0$ is Bragg angle. Further, the following expressions (2) and (3) are substituted into the above expression (1) to obtain the following expression (4).

$$\beta size = \lambda/(\varepsilon \cos \theta_0) \quad (2)$$

$$\beta strain = \eta \tan \theta_0 \quad (3)$$

$$\beta \cos \theta_0/\lambda = 1/\varepsilon + \eta \sin \theta_0/\lambda \quad (4)$$

On a two-axis graph with the vertical axis representing $\beta \cos \theta_0/\lambda$ and the horizontal axis representing $\sin \theta_0/\lambda$, values determined from multiple diffraction profiles with different 20 values are plotted, and the plots are linearly regressed. The slope of the obtained regression line is strain (non-uniform lattice strain) and the reciprocal of the segment of the regression line is crystallite size.

The above-described strain may be an average value. Specifically, respective diffraction profiles (multiple diffraction profiles that are different in incident angle) are obtained at given three measurement sites in the cutting edge face of the base material, and the η value at each measurement site is calculated. The average of respective η values is determined as the strain. The measurement sites are located in a region of the base material at a thickness in the depth direction of 1.5 μm from the cutting edge face of the base material. Specifically, the strain is measured at each measurement site as an integral value of the strain of the base material in the region from the cutting edge face to the 1.5 μm depth.

The inventors also calculated respective η values at multiple measurement sites of the cutting edge face to confirm that there is no significant difference between each value and the average value. Therefore, the strain may be measured at a given single site of the cutting edge face and the value taken at this site may be determined as the strain.

If the measured strain has an apparently abnormal value, however, such a value should be excluded. The single site is preferably determined in a central portion of the cutting edge face, since this portion contributes significantly to characteristics of the cutting tool and is therefore appropriate as a site for evaluating the characteristics of the cutting tool.

A sufficiently small strain of "less than or equal to 0.07" enables a still longer life of the cutting tool. This is for the reason that the small strain at such a position improves the peeling resistance of a coating formed on the base material as described below. The strain is more preferably less than or equal to 0.05. In this case, a still further longer life of the cutting tool is possible. Theoretically, it is most preferable that the strain is 0.

<<Coating>>

The cutting tool of the present embodiment includes a coating formed on the base material. As long as the coating includes the hard layer, the coating may be a single layer structure made up of a single layer, or a multilayer structure in which two or more layers are stacked together. The coating may include, other than the hard layer, an underlayer, a state-of-use indication layer (surface layer), and the like, for example.

The coating has a thickness of preferably 0.3 to 15 µm. The coating having a thickness of more than or equal to 0.3 µm can sufficiently exhibit the characteristics of the coating. The coating can have a thickness of less than or equal to 15 µm to suppress peel-off of the coating due to an excessively large coating thickness.

The thickness of the coating is determined in the following way. First, a sample for measurement including a cross section parallel to the normal direction to the surface of the base material is prepared. Next, the cross section is observed with a scanning transmission electron microscope (STEM), and the magnification is adjusted so that the whole thickness-direction region of the coating is included in an observed image. Respective thicknesses at five or more points are measured and the average value of the measured thicknesses is determined as the thickness. The same applies to the thickness of the hard layer described below.

<<Hard Layer>>

The hard layer included in the coating may be a single layer structure made up of a single layer, or a multilayer structure in which two or more layers are stacked together. The topmost layer in the hard layer has a compressive stress of more than or equal to 1.5 GPa in absolute value. Topmost layer herein means a layer located furthest away from the base material among the layers constituting the hard layer. If the hard layer is a single layer, the hard layer is the same as the topmost layer in the hard layer.

In the hard layer to which a compressive stress is imparted by a post treatment, the largest compressive stress tends to be imparted to the topmost layer in the hard layer, because of the nature of the post treatment. When the topmost layer in the hard layer has such a large compressive stress, the coating including this hard layer is likely to drop off from the base material in the conventional cutting tool.

In contrast, in the cutting tool of the present embodiment, the adhesiveness between the base material and the coating is high as described above. Therefore, regardless of the fact that the coating includes the hard layer to which a large compressive stress is imparted, peel-off of the coating due to the compressive stress is sufficiently suppressed. Accordingly, the cutting tool of the present embodiment can be excellent in both the wear resistance and the fracture resistance and therefore have a long life.

The reason why a coating including a hard layer having a large compressive stress is likely to drop off from the base material is not clear. However, if "a coating having a large compressive stress" is considered as "a coating in which a large stress variation occurs due to a post treatment," the following is inferred.

A coating in which a large stress variation has occurred has a feature that the coating is prone to self-destruct and/or prone to include defects such as fine cracks. A coating including a self-destructing part or fine cracks is likely to drop off from the base material. Therefore, "a coating having a large compressive stress" which is a coating in which a large stress variation has occurred is likely to drop off.

"Compressive stress" is a kind of internal stress (inherent strain) within a layer. The compressive stress is a stress represented by a − (negative) numerical value (the unit of the compressive stress is herein "GPa"). The concept that the compressive stress is large therefore means that the absolute value of the aforementioned numerical value is large, while the concept that the compressive stress is small means that the absolute value of this numerical value is small.

The compressive stress in the topmost layer can be measured in accordance with the $\sin^2\Psi$ method with an x-ray stress measurement apparatus. This $\sin^2\Psi$ method using x-ray is widely used as a method for measuring the compressive stress in a polycrystalline material. For example, the method detailed in "X-Ray Stress Measurement Method," The Society of Materials Science, Japan, issued by Yokendo (1981), pp. 54-67 can be used as a method for measuring the compressive stress.

When the $\sin^2\Psi$ method is used to measure the residual compressive stress in the topmost layer and another layer such as state-of-use indication layer is present on the topmost layer, electropolishing or flat milling for example may be performed as required to remove the other layer and expose the topmost layer. Then, the compressive stress in the exposed topmost layer is measured.

Preferably, the absolute value of the compressive stress in the topmost layer is 1.5 to 5.5 GPa inclusive. If the absolute value is more than 5.5 GPa, there is a higher tendency of the topmost layer to self-destruct. More preferably, the absolute value of the compressive stress in the topmost layer is 3.5 to 5.5 GPa.

Preferably, each layer forming the hard layer (the hard layer itself if the hard layer has a single layer structure) is a compound layer made from: at least one kind of first element selected from the group consisting of Group IV elements (Ti, Zr, Hf), Group V elements (V, Nb, Ta), and Group VI elements (Cr, Mo, W) in the periodic table, Al, and Si; and at least one kind of second element selected from the group consisting of B, C, N, and O. The hard layer formed of such a compound layer is suitable as a coating of the cutting tool.

Specific examples of the compound layer may be TiCNO layer, TiBN layer, TiC layer, TiN layer, TiAlN layer, TiSiN layer, AlCrN layer, AlCrON layer, AlCrO layer, TiAlSiN layer, TiAlON layer, AlCrSiCN layer, TiCN layer, TiSiC layer, CrSiN layer, AlTiSiCO layer, TiSiCN layer, $ZrO_2$ layer, $Al_2O_3$ layer, and the like.

Particularly the topmost layer in the hard layer preferably includes an Al oxide layer. The Al oxide layer is especially prone to self-destruct when a large compressive stress is imparted to the Al oxide layer, and therefore tends to induce the coating to peel off from the base material. In contrast, in the cutting tool of the present embodiment, the high adhesiveness between the base material and the coating suppresses drop-off of the coating, as compared with the conventional cutting tool.

Among others, the hard layer preferably has a multilayer structure made up of a TiN layer, a TiCN layer, and an Al oxide layer stacked in this order from the base material side. Such a multilayer structure can significantly improve the wear resistance, the oxidation resistance, the heat-resistant stability, and the chipping resistance of the cutting tool by a synergistic effect of the layers.

Examples of the Al oxide layer may be AlCrON layer, AlCrO layer, TiAlON layer, AlTiSiCO layer, $Al_2O_3$ layer and the like.

The hard layer is preferably a chemical vapor deposition layer formed by the CVD method. One of the reasons for this is the high adhesiveness of the chemical vapor deposition layer to the base material, as compared with a physical vapor deposition layer formed by the physical vapor deposition (PVD) method. Another reason is that the chemical vapor deposition layer differs from the physical vapor deposition layer in that the entire chemical vapor deposition layer has a tensile stress in most cases. Therefore, a hard layer which is a chemical vapor deposition layer and has a large compressive stress is more likely to drop off due to a large stress variation resulting from a post treatment, relative to a hard layer which is a physical vapor deposition layer and has a large compressive stress. In other words, the hard layer of the present embodiment that is a chemical vapor deposition layer is expected to exhibit significant adhesiveness as compared with the conventional cutting tool. The chemical vapor deposition layer and the physical vapor deposition layer are clearly distinguished from each other through SEM observation of respective surfaces of these layers.

The hard layer has a thickness of preferably 0.3 to 15 μm. The hard layer having a thickness of more than or equal to 0.3 μm can sufficiently exhibit the characteristics of the hard layer. Regarding the hard layer having a thickness of less than or equal to 15 μm, peeling off of the hard layer due to an excessively large thickness of the hard layer can be suppressed. In terms of the balance between exhibition of characteristics owing to the imparted compressive stress and suppression of the self-destruction, the topmost layer in the hard layer has a thickness of preferably 0.3 to 15 μm and more preferably 2.5 to 5.5 μm.

<Method for Manufacturing Cutting Tool>

A method for manufacturing a cutting tool of the present embodiment includes the step of preparing a base material precursor, the step of producing a base material by machining a surface of the base material precursor, the step of forming a coating on the base material, and the step of imparting a compressive stress to the coating. In the following, each step is described in detail.

<<Step of Preparing Base Material Precursor>>

In this step, a base material precursor is prepared. The base material precursor may be a cemented carbide or a cermet as described above. The base material precursor is machined into "base material." Specifically, the surface of the base material precursor is machined as detailed later herein to thereby form a cutting edge face. The shape of the base material precursor is therefore similar to the shape of the base material except that the base material precursor does not yet have a cutting edge face.

<<Step of Producing Base Material>>

In this step, a surface of the base material precursor is machined. The machining is one of a first grinding process of alternately repeating wet grinding and dry grinding, a second grinding process of performing low-feed low-depth-of-cut wet grinding, or a third grinding process of performing dry grinding. In this way, the base material of the cutting tool is produced.

The surface of the base material precursor to be machined is a ridgeline vicinity portion including a ridgeline at which a first surface and a second surface of the base material precursor meet, and a vicinity of the ridgeline. The first surface and the second surface of the base material precursor are respective portions that are to form a rake face and a flank face of the base material, and the ridgeline vicinity portion of the base material precursor is a portion that is to form a cutting edge face of the base material.

For example, the ridgeline vicinity portion machined in an arcuate shape forms a cutting edge face as shown in FIG. 4, and the ridgeline vicinity portion machined in a flat shape forms a cutting edge face as shown in FIG. 5. Specifically, the machining is beveling of the ridgeline vicinity portion of the base material precursor.

First Grinding Process

Examples of the wet grinding (a process using water for grinding) in the first grinding process may include wet brushing, wet barrel finishing, and wet blasting. Conditions for this wet grinding are not particularly limited. For example, the wet grinding may be either high-feed high-depth-of-cut grinding or low-feed low-depth-of-cut grinding.

Examples of the dry grinding (a process using no water for grinding) in the first grinding process may include dry brushing, dry barrel finishing, and dry blasting. Conditions for this dry grinding are not particularly limited. For example, the dry grinding may be either high-feed high-depth-of-cut grinding or low-feed low-depth-of-cut grinding.

The reasons why the first grinding process enables manufacture of the aforementioned cutting tool with a low oxygen concentration are as follows. For the conventional machining of the base material precursor into the base material, the high-feed high-depth-of-cut wet grinding is performed. A first reason for this is a high productivity of the high-feed high-depth-of-cut wet grinding. A second reason for this is that the dry grinding has been considered as causing oxidation of the base material surface due to heat generated during the grinding. A third reason for this is that the productivity of the low-feed low-depth-of-cut wet grinding has been considered as low.

However, this high-feed high-depth-of-cut wet grinding causes oxygen to enter from the cutting edge face toward the inside of the base material, resulting in decrease of the hardness of the base material itself and/or decrease of the adhesiveness between the base material and a coating.

In contrast, according to the method for manufacturing in the present embodiment, the machining in which wet grinding and dry grinding are repeated is performed, instead of the conventional machining in which high-feed high-depth-of-cut wet grinding is performed. Such machining of the present embodiment provides the treated surface (cutting edge face) with the following.

A single wet grinding process is performed to bevel the base material precursor while oxygen enters from the surface of the base material precursor. The time taken to perform this wet grinding can be shortened as compared with the conventional process. Therefore, the oxygen concentration in the base material and the width of a high oxygen region (depth extending straight from the cutting edge face toward the inner portion in the base material) after the single wet grinding process are smaller than the conventional process. Further, the dry grinding subsequent to the wet grinding does not cause oxygen to enter into the base material precursor. Therefore, the dry grinding is performed to bevel the base material precursor while removing the high oxygen region formed during the preceding wet grinding.

Thus, consequently the width of the high oxygen region is smaller than the conventional process, or there is no high oxygen region which may influence the physical properties of the base material. Accordingly, the aforementioned base material having an oxygen concentration of less than or equal to 1 at. % at a depth position of 0.4 μm from the cutting edge face is produced.

Although the number of times the wet grinding and the dry grinding are repeated is not particularly limited, each of the wet grinding and the dry grinding is performed at least once. Preferably, the wet grinding and the dry grinding are alternately repeated three or more times. In this way, the width of the high oxygen region formed in each wet grinding process can further be reduced. Accordingly, the final high oxygen region width can also further be reduced. The oxygen concentration itself in the high oxygen region can also be reduced.

Preferably, the initial process in the machining process is the wet grinding and the final process therein is the dry grinding. The wet grinding as the initial process can improve the productivity and the dry grinding as the final process can control the high oxygen region width so that the high oxygen region width is sufficiently small in the finally obtained base material.

Second Grinding Process

Examples of the low-feed low-depth-of-cut wet grinding in the second grinding process may include wet brushing, wet barrel finishing, and wet blasting, like the first grinding process. The second grinding process suppresses entering of oxygen into the base material which is caused by the conventional high-feed high-depth-of-cut wet grinding, and therefore enables manufacture of the aforementioned cutting tool having a low oxygen concentration.

While "low-feed low-depth-of-cut" for wet grinding varies depending on the type of grinding, "low-feed low-depth-of-cut" for wet brushing for example herein means that the feed is 200 mm/sec or less and the depth of cut is 1.5 mm or less. "High-feed high-depth-of-cut" for wet grinding which is wet brushing for example herein means that the feed is 300 mm/sec or more and the depth of cut is 3 mm or more.

The wet grinding in the second grinding process is preferably performed at certain intervals, rather than continuously. Specifically, preferably a process in which the wet grinding is performed for a given time, subsequently stopped for a given time, and subsequently performed for a given time and so on is repeated. In this way, the advantageous effect of suppressing entering of oxygen can be improved.

Third Grinding Process

Examples of the dry grinding in the third grinding process may include dry brushing, dry barrel finishing, and dry blasting, like the first grinding process. Conditions for this dry grinding in the third grinding process are not particularly limited. For example, the dry grinding may be either high-feed high-depth-of-cut grinding or low-feed low-depth-of-cut grinding. The third grinding process suppresses entering of oxygen into the base material which is caused by the conventional high-feed high-depth-of-cut wet grinding, and therefore enables manufacture of the aforementioned cutting tool having a low oxygen concentration.

The first grinding process, the second grinding process, and the third grinding process are as described above. The machining is preferably the first grinding process. In this case, the cutting tool having a low oxygen concentration can be manufactured while keeping a high productivity.

<<Step of Forming Coating>>

In this step, a coating is formed on a surface of the base material. As a method for forming the coating, a PVD or CVD method may be used. In the present embodiment, the CVD method is preferably used. When the CVD method is used, the film deposition temperature is 800 to 1200° C. This temperature is higher than that of the physical vapor deposition method. The CVD method thus increases the adhesiveness between the base material and the coating. A conventionally known method may be used as the CVD method.

<<Step of Imparting Compressive Stress to Coating>>

In this step, a compressive stress is imparted to the coating. A post treatment for imparting a compressive stress may be any of various methods like brushing, or blasting such as sand blasting, wet blasting, shot peening, or bombardment for PVD, for example. Accordingly, a compressive stress can be imparted to the coating. As a result, the compressive stress is imparted to the hard layer in the coating. In particular, a larger compressive stress can be imparted to the topmost layer.

In this way, the aforementioned cutting tool can be manufactured including the base material having an oxygen concentration of less than or equal to 1 at. % at a depth position of 0.4 μm from the cutting edge face, and a coating which includes a topmost layer (hard layer) having a compressive stress of more than or equal to 1.5 GPa in absolute value. This cutting tool can have a long life.

The strain in the cutting edge face of the base material can be controlled to be small by adjusting conditions for the machining.

EXAMPLES

In the following, the present invention is described in further detail with reference to Examples. The present invention, however, is not limited to them. Respective cutting tools of Examples 1 to 15 and respective cutting tools of Comparative Examples 1 to 5 were produced, and their characteristics were evaluated.

<<Production of Cutting Tool of Example 1>>

A base material for Example 1 was produced in the following way. The cutting tool is formed of the base material with the following specifications.

Insert Model No.: CNMG120408N-UX (manufactured by Sumitomo Electric Hardmetal)

Material: cemented carbide specified by JIS B4120 (2013)

First, raw material powder made up of a mixture having a composition: 2.0 mass % TaC, 1.0 mass % NbC, 6 mass % Co, and the balance WC (containing inevitable impurities) was press-formed in a predetermined shape, and thereafter sintered at 1300 to 1500° C. for 1 to 2 hours. Accordingly, a base material precursor was obtained.

Next, on a ridgeline vicinity portion of the base material precursor, the below-described wet grinding and dry grinding were alternately repeated in this order five times, i.e., the first grinding process was performed. Accordingly, the ridgeline vicinity portion of the base material precursor was machined so that an arcuate cutting edge face with R=0.03 mm was formed. In this way, the base material was produced.

Wet Grinding
type: barrel finishing
media: plastic
process liquid: water time: 5 minutes
Dry Grinding
  type: brushing
  brush: nylon
  rotational speed: 100 rpm
  depth of cut: 1.5 mm
  feed: 150 mm/sec
  process liquid: none
  time: 1 minute
  paste: diamond paste with an average particle size of 10 μm or less (liquid component contained in the paste is solid oil)

Next, a CVD apparatus was used to form a coating shown in Table 1 on the entire surface of the base material by the MT-CVD method. For example, the coating of Example 1 is a coating in which a hard layer and a TiN layer (state-of-use indication layer) are stacked and the hard layer includes a TiN layer, a TiCN layer, and an $Al_2O_3$ layer (topmost layer) that are stacked in order from the surface of the base material. The state-of-use indication layer is a TiN layer having a thickness of less than or equal to 0.5 μm, and is located at the topmost surface. In the parentheses following the composition of each layer, the thickness (μm) of the layer is indicated. The MT-CVD method is a method for depositing a layer under a relatively mild temperature environment of 850 to 950° C.

Next, the following blasting was performed on the entire surface of the coating formed on the surface of each base material. Specifically, balls made of aluminum oxide having an average particle size of 50 μm were forced to impinge uniformly against the rake face, the flank face, and the cutting edge face for 5 seconds by means of compressed air (projection pressure) at 0.10 MPa, in the direction at 45° with respect to an imaginary ridgeline formed by an imaginary plane including the rake face and an imaginary plane including the flank face, while the insert was rotated at 100 rpm. In this way, a compressive stress was imparted to the hard layer. Accordingly, the cutting tool of Example 1 was produced.

<<Production of Cutting Tools of Examples 2-12>>

Respective base materials for Examples 2 to 12 were produced similarly to Example 1, except that the process time and the number of repetition times of each of the above-described wet grinding and dry grinding were changed appropriately for the machining of the base material precursor.

Next, a coating was formed by a method similar to Example 1, except that the composition and the thickness of each layer forming the coating were changed as shown in Table 1.

Next, a compressive stress was imparted to each coating by changing the projection pressure and the process time of

TABLE 1

| sample | base material | coating hard layer | state-of-use indication layer |
|---|---|---|---|
| Example 1 | cemented carbide | base material/TiN (0.4)/TiCN (6.5)/$Al_2O_3$ (3.5) | TiN (0.5) |
| Example 2 | cemented carbide | base material/TiN (0.4)/TiCN (8.3)/$Al_2O_3$ (5.5) | TiN (0. 5) |
| Example 3 | cemented carbide | base material/TiN (0.4)/TiCN (6.5)/$Al_2O_3$ (3.5) | TiN (0.5) |
| Example 4 | cemented carbide | base material/TiN (0.4)/TiCN (6.5)/$Al_2O_3$ (3.5) | TiN (0.5) |
| Example 5 | cemented carbide | base material/TiN (0.4)/TiAlSiN (3.5)/AlCrON (3.5) | |
| Example 6 | cemented carbide | base material/TiN (0.4)/TiCN (6.5)/$Al_2O_3$ (3.5) | TiN (0.5) |
| Example 7 | cemented carbide | base material/TiN (0.4)/TiCN (4.0)/$Al_2O_3$ (2.5) | TiN (0.5) |
| Example 8 | cemented carbide | base material/TiN (0.4)/TiCN (5.0)/$Al_2O_3$ (4.5) | TiN (0.5) |
| Example 9 | cemented carbide | base material/TiN (0.4)/TiCN (6.5)/$Al_2O_3$ (3.5) | TiN (0.5) |
| Example 10 | cemented carbide | base material/TiN (0.4)/TiCN (8.3)/$Al_2O_3$ (5.5) | TiN (0.5) |
| Example 11 | cemented carbide | base material/TiN (0.4)/TiCN (4.5)/AlCrO (3.0) | |
| Example 12 | cemented carbide | base material/TiN (0.4)/TiCN (8.0) | |
| Example 13 | cermet | base material/TiN (0.4)/TiCN (3.0)/$Al_2O_3$ (3.0) | |
| Example 14 | cemented carbide | base material/TiN (0.4)/TiCN (6.5)/$Al_2O_3$ (3.5) | TiN (0.5) |
| Example 15 | cemented carbide | base material/TiN (0.4)/TiCN (6.5)/$Al_2O_3$ (3.5) | TiN (0.5) |
| Comparative Example 1 | cemented carbide | base material/TiN (0.4)/TiCN (6.5)/$Al_2O_3$ (3.5) | TiN (0.5) |
| Comparative Example 2 | cemented carbide | base material/TiN (0.4)/TiCN (6.5)/$Al_2O_3$ (3.5) | TiN (0.5) |
| Comparative Example 3 | cemented carbide | base material/TiN (0.4)/TiCN (8.3)/$Al_2O_3$ (5.5) | TiN (0.5) |
| Comparative Example 4 | cemented carbide | base material/TiN (0.4)/TiCN (4.5)/TiAlON (3.0) | |
| Comparative Example 5 | cemented carbide | base material/TiN (0.4)/TiCN (3.0)/$Al_2O_3$ (3.0) | | blasting appropriately. Accordingly, respective cutting tools of Examples 2 to 12 were produced.

<<Production of Cutting Tool of Example 13>>

The base material for Example 13 was produced in the following way. The cutting tool is formed of the base material with the following specifications.

Insert Model No.: CNMG120408N-UX (manufactured by Sumitomo Electric Hardmetal)

Material: cermet of grade P20

First, raw material powder made up of a mixture having a composition: 7 mass % NbC, 7 mass % $Mo_2C$, 10 mass % Co, 5 mass % Ni, 20 mass % WC, and the balance TiCN (containing inevitable impurities) was press-formed in a predetermined shape, and thereafter sintered at 1300 to 1650° C. for 1 to 2 hours. Accordingly, a base material precursor was obtained.

Next, on a ridgeline vicinity portion of the base material precursor, machining was performed similarly to Example 1 except that the process time and the number of repetition times of each of the above-described wet grinding and dry grinding were changed appropriately. Accordingly, the ridgeline vicinity portion of the base material precursor was machined so that an arcuate cutting edge face with R=0.03 mm was formed. In this way, the base material was produced.

Next, a coating was formed by a method similar to Example 1, except that the composition and the thickness of each layer forming the coating were changed as shown in Table 1.

Next, a compressive stress was imparted to the coating by changing the projection pressure and the process time of blasting appropriately. Accordingly, the cutting tool of Example 13 was produced.

<<Production of Cutting Tool of Example 14>>

The cutting tool of Example 14 was produced similarly to Example 1, except that the following low-feed low-depth-of-cut wet grinding, i.e., second grinding process, was performed as the machining of the base material precursor.

Wet Grinding
type: barrel finishing
media: plastic
process liquid: water
time: 3 minutes <<Production of Cutting Tool of Example 15>>

The cutting tool of Example 15 was produced similarly to Example 1, except that the following dry grinding, i.e., third grinding process, was performed as the machining of the base material precursor.

Dry Grinding
type: brushing
brush: nylon
rotational speed: 100 rpm
process liquid: none
time: 1 minute
paste: diamond paste with an average particle size of 10 μm or less (liquid component contained in the paste is solid oil)

<<Production of Cutting Tools of Comparative Examples 1-5>>

Comparative Examples 1 to 5 were produced in the following way. First, a base material precursor made of a cemented carbide was produced similarly to Example 1. Then, respective base materials of Comparative Examples 1 to 5 were produced similarly to Example 1, except that the below-described high-feed high-depth-of-cut wet grinding was performed without performing the above-described dry grinding, as the machining of the base material precursor.

Wet Grinding
type: barrel finishing
media: plastic
process liquid: water
time: 3 minutes Next, a coating was formed by a method similar to Example 1, except that the composition and the thickness of each layer forming the coating were changed as shown in Table 1.

Next, a compressive stress was imparted to each coating by changing the projection pressure and the process time of blasting appropriately. Accordingly, respective cutting tools of Comparative Examples 1 to 5 were produced.

<<Evaluation of Characteristics>>

For each cutting tool, the oxygen concentration at a depth position of 0.4 μm from the cutting edge face, the oxygen concentration at a depth position of 0.2 μm from the cutting edge face, the strain in the cutting edge face, and the compressive stress in the topmost layer were each measured in the way as described above.

The oxygen concentrations and the strain were each measured at given three measurement sites of the cutting edge face. One of the three measurement sites was a central portion of the cutting edge face. The results are shown in Table 2.

The following apparatuses were used.

XPS analyzer (for measurement of oxygen concentration): "JPS-9030" manufactured by JEOL Ltd.

x-ray apparatus (for measurement of strain): "SPring 8," Japan Synchrotron Radiation Research Institute: JASRI x-ray stress measurement apparatus (for measurement of compressive stress): "JSM-7800" manufactured by JEOL Ltd.

In Table 2, the column "compressive stress (GPa)" indicates the absolute value of each compressive stress. The column "0.4 oxygen concentration (at. %)" indicates the oxygen concentration at a depth position of 0.4 μm from the cutting edge face, and the column "0.2 oxygen concentration (at. %)" indicates the oxygen concentration at a depth position of 0.2 μm from the cutting edge face. The values of oxygen concentrations and strain are each an average value of measurements taken at three measurement sites.

Conditions for the radiation (high brightness x-ray) of SPring-8 used for measurement of strain by x-ray diffractometry are as follows.

beam line: BL16XU
incident x-ray energy: 10.012 keV (wavelength λ: 1.2385 angstrom)
scanning range: 20° to 120° at 2θ

<<Test 1: Fracture Resistance Test>>

With each cutting tool, cutting was performed under the following cutting conditions. The average wear amount Vb (mm) of the flank face after a cutting time of 20 minutes was measured. The results are shown in Table 2. For this test, a low-alloy steel undergoes low-speed cutting, and therefore, the workpiece to be cut is likely to adhere to the cutting tool. When the component adhering to the cutting tool drops off, the coating is likely to drop off, and consequently the wear amount increases. In view of this, this test can be performed to evaluate the fracture resistance of the cutting tool involved in drop-off of the coating. Specifically, the smaller the value of Vb (mm), the higher the fracture resistance.

Cutting Conditions
workpiece: SCM415
cutting speed: 100 m/min
feed: 0.2 mm/rev
depth of cut: 2.0 mm
cutting liquid: water-soluble cutting oil <<Test 2: Wear Resistance Test>>

With each cutting tool, cutting was performed under the following cutting conditions. The average wear amount Vb (mm) of the flank face after a cutting time of 15 minutes was measured. The results are shown in Table 2. The smaller the value of Vb (mm), the higher the wear resistance.

Cutting Conditions
workpiece: FCD700
cutting speed: 200 m/min
feed: 0.2 mm/rev
depth of cut: 2.0 mm
cutting liquid: water-soluble cutting oil

TABLE 2

| sample | compressive stress (GPa) | 0.4 oxygen concentration (at. %) | 0.2 oxygen concentration (at. %) | strain | Test 1 Vb (mm) | Test 2 Vb (mm) |
|---|---|---|---|---|---|---|
| Example 1 | 1.6 | 0.8 | 8.5 | 0.02 | 0.07 | 0.12 |
| Example 2 | 1.8 | 0.8 | 6.3 | 0.03 | 0.04 | 0.09 |
| Example 3 | 1.5 | 0.9 | 9.2 | 0.02 | 0.05 | 0.11 |
| Example 4 | 2.3 | 0.7 | 5.3 | 0.06 | 0.06 | 0.08 |
| Example 5 | 3.5 | 0.8 | 8.8 | 0.04 | 0.05 | 0.12 |
| Example 6 | 1.5 | 0.9 | 5.4 | 0.09 | 0.12 | 0.18 |
| Example 7 | 1.6 | 0.7 | 9.2 | 0.12 | 0.11 | 0.17 |
| Example 8 | 1.9 | 0.8 | 8.3 | 0.15 | 0.09 | 0.18 |
| Example 9 | 2.5 | 0.7 | 13.5 | 0.09 | 0.15 | 0.21 |
| Example 10 | 3.2 | 0.8 | 15.2 | 0.11 | 0.14 | 0.22 |
| Example 11 | 1.8 | 0.7 | 11.3 | 0.14 | 0.16 | 0.21 |
| Example 12 | 1.8 | 0.8 | 6.2 | 0.02 | 0.05 | 0.10 |
| Example 13 | 5.5 | 0.7 | 4.2 | 0.03 | 0.04 | 0.09 |
| Example 14 | 1.6 | 0.7 | 13.5 | 0.12 | 0.15 | 0.20 |
| Example 15 | 1.6 | 0.7 | 15.5 | 0.08 | 0.16 | 0.21 |
| Comparative Example 1 | 1.6 | 1.2 | 13.2 | 0.08 | 3.25 | 3.89 |
| Comparative Example 2 | 0.8 | 1.3 | 14.2 | 0.32 | 2.85 | 3.46 |
| Comparative Example 3 | 1.3 | 2.4 | 15.6 | 0.21 | 2.36 | 3.65 |
| Comparative Example 4 | 2.4 | 1.2 | 12.1 | 0.12 | 3.49 | 3.35 |
| Comparative Example 5 | 0.8 | 1.4 | 14.3 | 0.32 | 2.43 | 3.74 |

As shown in Table 2, the cutting tools of Examples 1 to 15 exhibited higher fracture resistance and higher wear resistance as compared with the cutting tools of Comparative Examples 1 to 5. It was thus confirmed that the cutting tools of the Examples were longer in life than the cutting tools of the Comparative Examples.

The embodiments and Examples of the present invention are those as described above. It is originally intended that features of the above-described embodiments and Examples may be combined as appropriate.

It should be construed that the embodiments and examples disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

10 cutting tool; 1 base material; 1*a* rake face; 1*b* flank face; 1*c* cutting edge face; 2 coating

The invention claimed is:

1. A surface-coated cutting tool comprising a base material and a coating formed on the base material,
    the base material being a cemented carbide or a cermet,
    a surface of the base material including a rake face, a flank face, and a cutting edge face connecting the rake face to the flank face,
    the base material having an oxygen concentration of less than or equal to 1 at. % at a depth position of 0.4 μm from the cutting edge face,
    the coating including a hard layer,
    a topmost layer in the hard layer having a compressive stress of more than or equal to 1.5 GPa in absolute value.

2. The surface-coated cutting tool according to claim 1, wherein the base material has an oxygen concentration of less than or equal to 10 at. % at a depth position of 0.2 μm from the cutting edge face.

3. The surface-coated cutting tool according to claim 1, wherein the topmost layer has a compressive stress of more than or equal to 3.5 GPa in absolute value.

4. The surface-coated cutting tool according to claim 1, wherein the hard layer is a compound layer made from:
    at least one kind of first element selected from the group consisting of Group IV elements, Group V elements, and Group VI elements in the periodic table, Al, and Si; and
    at least one kind of second element selected from the group consisting of B, C, N, and O.

5. The surface-coated cutting tool according to claim 1, wherein the topmost layer is a layer made from an oxide containing Al.

6. The surface-coated cutting tool according to claim 1, wherein the cutting edge face of the base material has a strain of less than or equal to 0.07.

7. A method for manufacturing a surface-coated cutting tool according to claim 1, the method comprising:
    preparing a base material precursor;
    producing a base material by machining a surface of the base material precursor;

forming, on the base material, a coating including a hard layer; and imparting a compressive stress to the coating, the machining being one of
- a first grinding process of alternately repeating wet grinding and dry grinding of the surface of the base material precursor;
- a second grinding process of performing low-feed low-depth-of-cut wet grinding, or
- a third grinding process of performing dry grinding.

* * * * *